Oct. 17, 1950 A. R. CLANTON 2,526,198
MACHINE FOR MOLDING CONCRETE BLOCKS
Filed Nov. 23, 1946 4 Sheets-Sheet 2

INVENTOR.
Albert Richard Clanton
BY
Paul A. Weilein
ATTORNEY.

Oct. 17, 1950 A. R. CLANTON 2,526,198
MACHINE FOR MOLDING CONCRETE BLOCKS
Filed Nov. 23, 1946 4 Sheets-Sheet 3
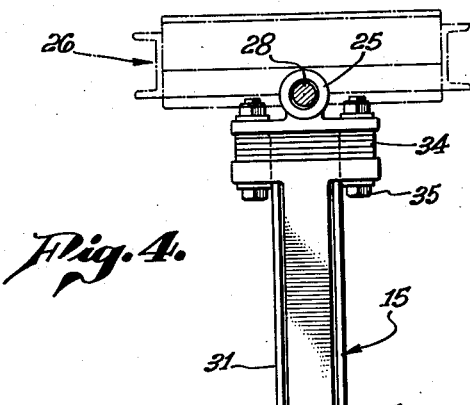
Fig. 4.
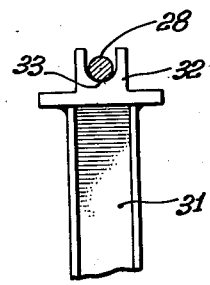
Fig. 5.
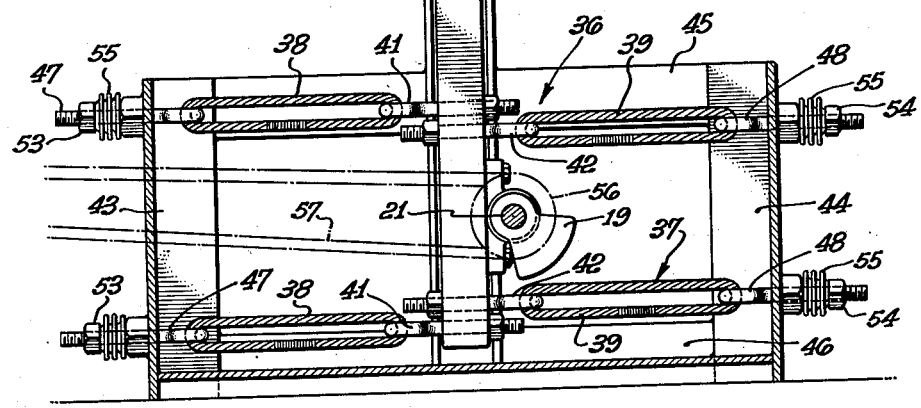
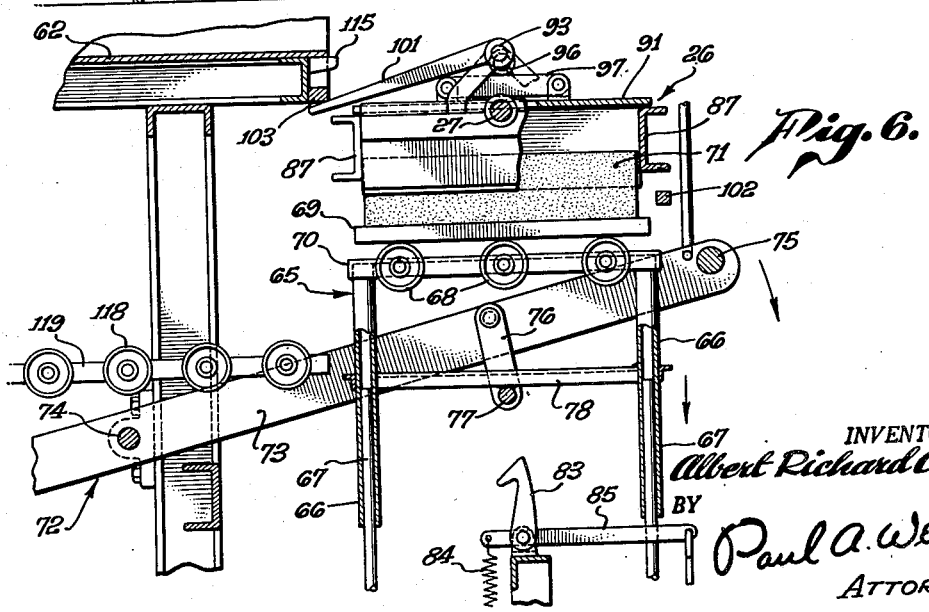
Fig. 6.
INVENTOR.
Albert Richard Clanton
BY
Paul A. Weilein
ATTORNEY.

Oct. 17, 1950
A. R. CLANTON
2,526,198
MACHINE FOR MOLDING CONCRETE BLOCKS
Filed Nov. 23, 1946
4 Sheets-Sheet 4
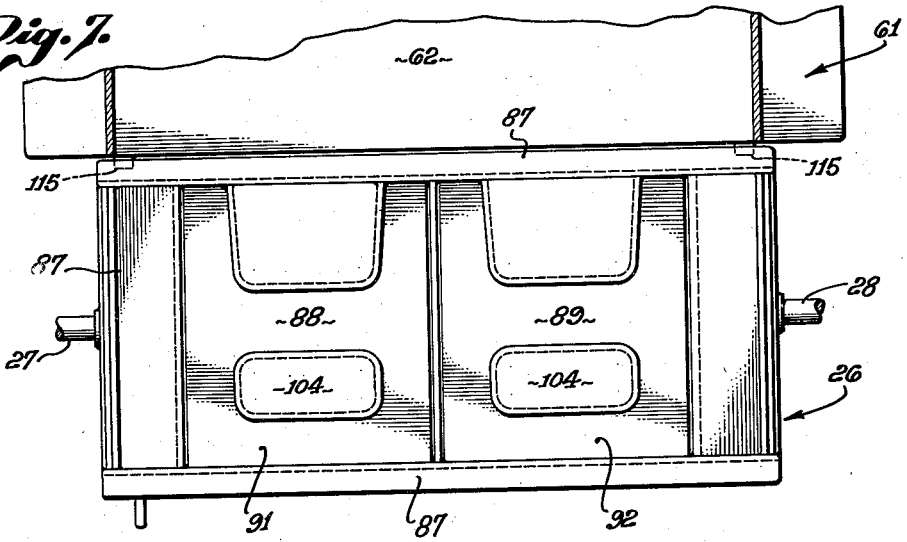
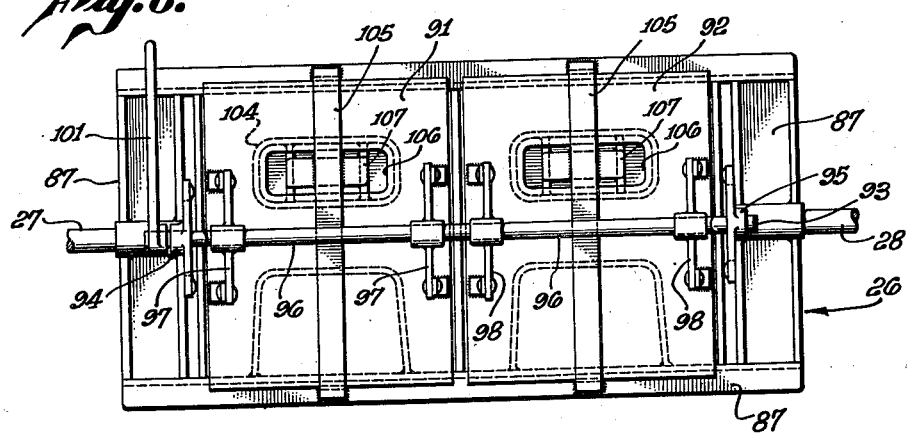
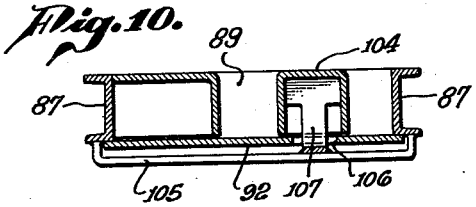
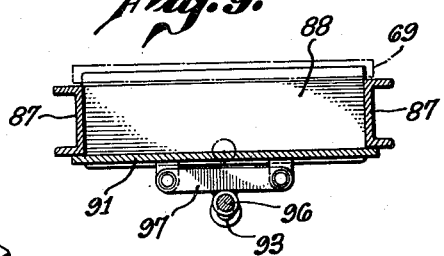
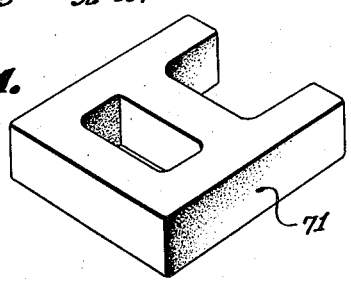
INVENTOR.
Albert Richard Clanton
BY
Paul A. Weilein
ATTORNEY.

Patented Oct. 17, 1950

2,526,198

UNITED STATES PATENT OFFICE 2,526,198

MACHINE FOR MOLDING CONCRETE BLOCKS

Albert Richard Clanton, North Hollywood, Calif.

Application November 23, 1946, Serial No. 712,022

13 Claims. (Cl. 25—41)

This invention relates to machines for forming articles such as building blocks, of cementitious material or the like, and more particularly to such machines in which cementitious material is packed into a mold by vibration so as to form a compact block of predetermined density.

One method of forming concrete building blocks is that of filling a mold of desired shape with concrete and then vibrating the mold to pack the concrete firmly thereinto, thereby filling the corners and interstices of the mold and creating a block of uniform density and surface texture.

It is an object of this invention to provide in a block forming machine, means for applying sudden shock to a mold, thereby firmly packing concrete into the mold.

It is another object to provide in a vibratory machine for forming concrete blocks, means for applying a series of shocks to the mold so that the effect of the vibration is reinforced by the shocking of the mold.

More particularly, it is an object of this invention to provide in such a vibratory machine, means for suddenly retarding a vibratory excursion of the mold so that the shock produced will pack the concrete more firmly into the mold.

Still more particularly, it is an object to utilize the force of gravity in a vibrating machine by applying upwardly directed shocks to the mold, whereby to take advantage not only of the sudden stopping in the movement of the mold, but also to utilize the weight of the concrete itself as the mold is shocked upwardly to pack the concrete more firmly into the mold.

It is another object of this invention to provide improved means for mounting a support for use in a vibrating machine and particularly for use in a vibrating machine wherein an eccentrically mounted rotor is utilized to vibrate the support.

More particularly it is an object of the invention to provide improved means for resiliently mounting a support, which latter may be then vibrated by a rotor eccentrically mounted thereon.

It is another object of this invention to provide in a machine for forming objects of concrete and the like, an improved mold characterized by means for aiding in the removal therefrom of a molded block.

It is another object to provide in combination with a machine for molding blocks of concrete, the combination of a mold having means for aiding in the removal therefrom of a block, which removal means is automatically actuated in response to movement of the mold with respect to the machine.

More particularly, it is an object of this invention to provide in a vibratory machine for molding concrete blocks, a rotatable mold having a loading position for receiving concrete and an ejecting position for delivering a molded block, and means on the mold for aiding in the removal therefrom of a molded block, which means is automatically actuated in response to rotation of the mold from its concrete receiving position to its block ejecting position.

It is another object of this invention to provide in a machine for molding blocks of concrete, carriage means for receiving the molded block from the mold and conveying it away from the mold.

More particularly, it is an object of this invention to provide a carriage as above specified in which the energy for advancing the carriage toward the mold is provided by the potential energy of the preceding molded block as it is withdrawn from the mold and lowered by the carriage. In this manner, oscillation of the carriage between its two positions is effectuated without the provision of external power or manual labor.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Figure 3 has been taken along line 3—3 of Figure 2;

Figure 4 is a sectional view taken along line 4—4 of Figure 2;

Figure 5 is a fragmentary view showing the impact member, whereby sudden shocks are administered to the mold during vibration thereof; Figure 5 has been taken along line 5—5 of Figure 2;

Figure 6 is a fragmentary side elevation similar to Figure 1 showing the mold rotated to eject a molded block and the carriage raised to receive the block therefrom;

Figure 7 is a plan view of the machine looking down into the mold;

Figure 8 is a view showing the bottom of the mold and illustrates particularly the means for holding the core inside the mold, and also illustrates the means for aiding in removal of a molded block from the mold;

Figure 9 is a sectional view of the mold illustrating the means for aiding in removal therefrom of a molded block. Figure 9 has been taken along line 9—9 of Figure 2;

Figure 2:
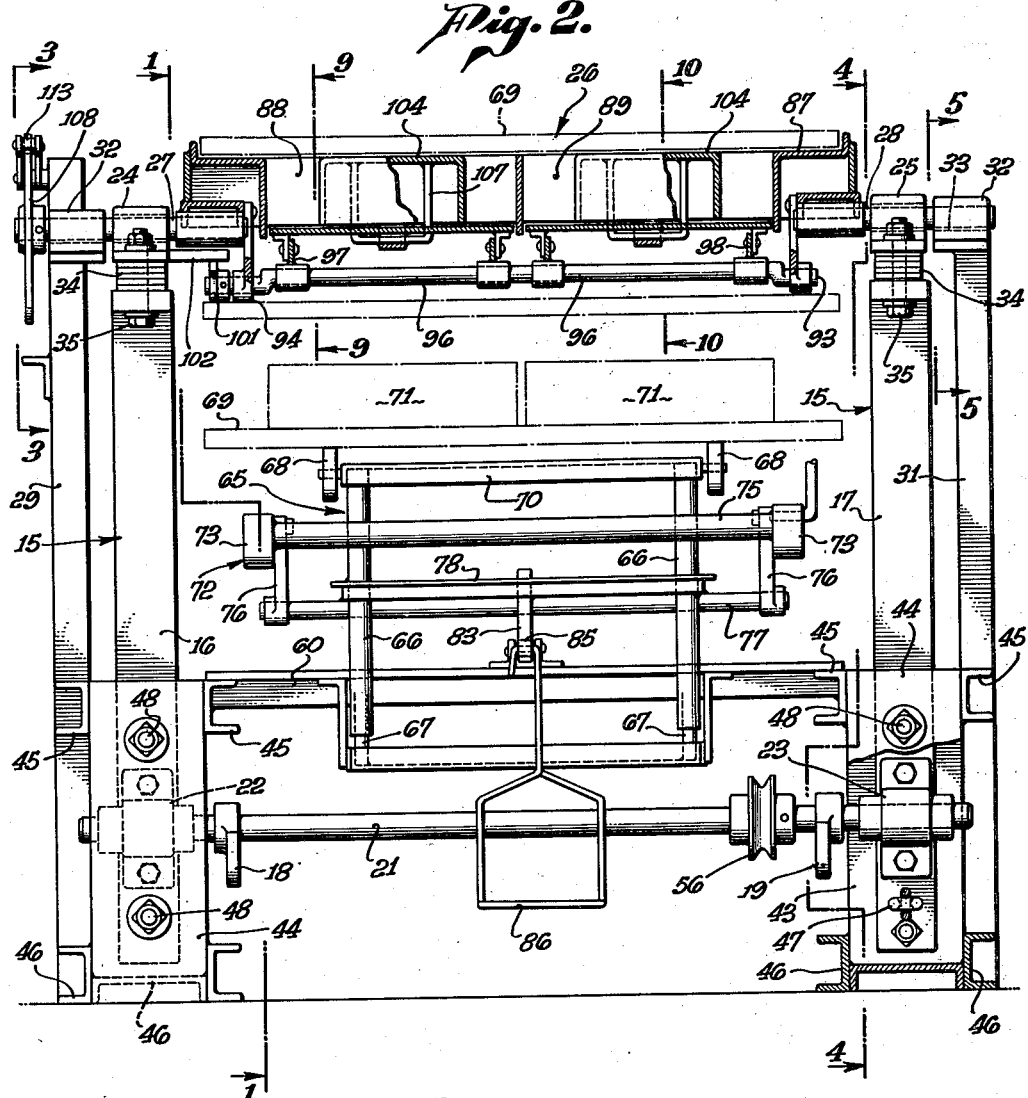
Figure 2 is a front view of the machine and illustrates that side of the machine faced by the operator in loading and unloading the mold. The view shown in Figure 2 has been partially sectioned to show the interior of the mold.

Figure 10, taken along line 10—10 of Figure 2, shows particularly the means for maintaining the internal core within the mold; and Figure 11 is a perspective view of a block molded in the machine of the invention.

The machine of this invention comprises a resiliently mounted support adapted to receive a mold for receiving cementitious material and the like. The support is mounted on elongate elements, tensioned between horizontally spaced anchor members. In this manner, the support, when vibrated, moves vertically so that the material in the mold is shaken down into the mold by the action of gravity upon the concrete in the mold.

To enhance the packing of the material into the mold, there is provided one or more impact members against which the mold is caused to strike in its downward excursion so that a sudden upwardly directed force or shock is thereby applied to the mold in each vibration thereof. This causes the concrete in the mold to be firmly driven into the corners of the mold and to be densely packed therein, thereby forming a compact and solid molded article.

With the completion of the packing operation the vibration of the support is stopped and the mold is rotated on the support so as to face downwardly. Responsive to rotation of the mold, means are automatically actuated to loosen the molded block from the walls of the mold, thereby aiding in the removal of the molded article from the mold.

With the mold in position to eject the molded article, and the article partially loosened from the walls of the mold, the support is again vibrated, thereby shaking the molded article onto a carriage. The weight of the article on the carriage automatically carries the carriage downward, where it is automatically latched, and the article is removed from the carriage as by a roller conveyor. In the lowering of the carriage by the weight of the article, energy is stored, which upon unlatching of the carriage is utilized to lift the carriage to article-receiving position. The operation may be repeated with each cycle of the machine.

Referring now to the drawings, the vibratory machine of this invention is illustrated having a support 15 comprised of a pair of spaced resiliently mounted uprights 16 and 17 (Figure 2). Means for vertically vibrating the support 15 are provided in the form of a pair of eccentrically mounted rotors 18 and 19 fixedly mounted on a shaft 21 journalled in bearings 22 and 23 on the respective uprights 16 and 17. Near the upper ends of uprights 16 and 17 are mounted bearings 24 and 25, respectively. A mold 26 is rotatably supported by means of stub shafts 27 and 28 in the bearings 24 and 25. Upon rotation of shaft 21 and eccentric rotors 18 and 19, support 15 vibrates vertically and the vertical vibration thereof is transmitted through bearings 24 and 25 to the mold 26 so that concrete or other material is packed into the mold.

To enhance the packing operation, there are provided impact members in the form of fixedly mounted uprights 29 and 31, at the top of which are provided U-shaped seats 32 (Figure 5), stub shafts 27 and 28 extending beyond the bearings 24 and 25, respectively, into the U-shaped seats 32 immediately above the bottom surfaces 33 thereof. The sides of the seats 32 serve to guide the vertical vibrations of the stub shafts 27 and 28. This relative position of shafts 27 and 28 with respect to surfaces 33 of seats 32 is attained during quiescence when the support 15 is not vibrating. Upon vertical vibration of support 15, the shafts 27—28 are alternately lifted from and dropped upon the impact surfaces 33. The resilient mounting of support 15 imparts to its vibration a characteristic approximating that of the typical sine vibration. Thus, the maximum velocity of shafts 27—28 in their vertical vibration (assuming the absence of impact members 29 and 31) would be achieved at the midpoint of the vibratory span. However, it is at substantially this vibratory midpoint that the impact surfaces 33 are located, so that with each downward vibratory excursion of the shafts 27—28 and of mold 26, the shafts are suddenly stopped by impact against the surfaces 33, causing a sudden upwardly directed shock against mold 26. This sudden retardation and consequent shock occurs substantially at the point of maximum velocity achieved by the mold 26 in its vibratory motion. In this manner, the maximum shocking action of the mold is achieved and the concrete is packed into the mold with great force.

To ease the shock upon bearings 22, 23, 24 and 25, resilient or semi-resilient packing, such as layers of rubber 34, are interposed between the bearings 24 and 25 and the upper ends of uprights 16 and 17, respectively, the packing being held between the bearings and the uprights proper by means of bolt and nut assemblies 35.

The resilient mounting of support 15 consisting of uprights 16 and 17 mentioned hereinbefore, will now be described for upright 17, it being understood that substantially identical mounting means are provided for the upright 16. Referring to Figure 4, the lower end of upright 17 is shown mounted on a pair of horizontal, elongate, tensioned elements 36 and 37. Each of the elements, for example element 36, consists of a wire rope 38 and 39, one on each side of upright 17, and anchored thereto by eyebolts 41 and 42, respectively. The outer end of the wire rope 38 is attached to a vertical, channeled, anchor member 43, while the outer end of wire rope 39 is attached to a similar anchor member 44. Horizontal strengthening between anchor members 43 and 44 is provided at the top by channel members 45 and at the bottom by similar channel members 46, which are conveniently made of two parts as shown in Figure 4. Between the two parts of the channel members is welded the upright impact member 31, as shown in Figures 2 and 4. Anchoring of wire ropes 38 and 39 to the anchor members 43 and 44 is achieved through eyebolts 47 and 48 respectively. Adjustability in tension of the cable 36 is provided by tightening or loosening of the backing nuts 53 and 54 bearing against washer members 55. It will be understood that the element 37 is similar in construction and mounting to element 36, occupying simply a position directly below element 36, and serving in cooperation therewith to maintain upright the member 17.

Reference to Figure 4 will show that upon rotation of eccentric rotors 18 and 19, the support 15 will vibrate vertically, the span of vibration being determined largely by the tension applied to flexible elements 36 and 37, and the relation between the rotative velocity of rotors 18 and 19 and the natural vibratory periodicity of the support 15 resiliently mounted on the tensioned elements.

Upright 16 is mounted in a manner similar to that just described for upright 17, and further description thereof is deemed unnecessary. The two upright assemblies above described are united into a single machine frame by means of transverse horizontal members such as shown at 60 in Figure 2.

Rotation of shaft 21 and consequent vibration of support 15 is achieved through a pulley 56 mounted on shaft 21 and engaged by a belt 57 in turn driven by a pulley 58 on the shaft of a motor 59.

Figure 1:
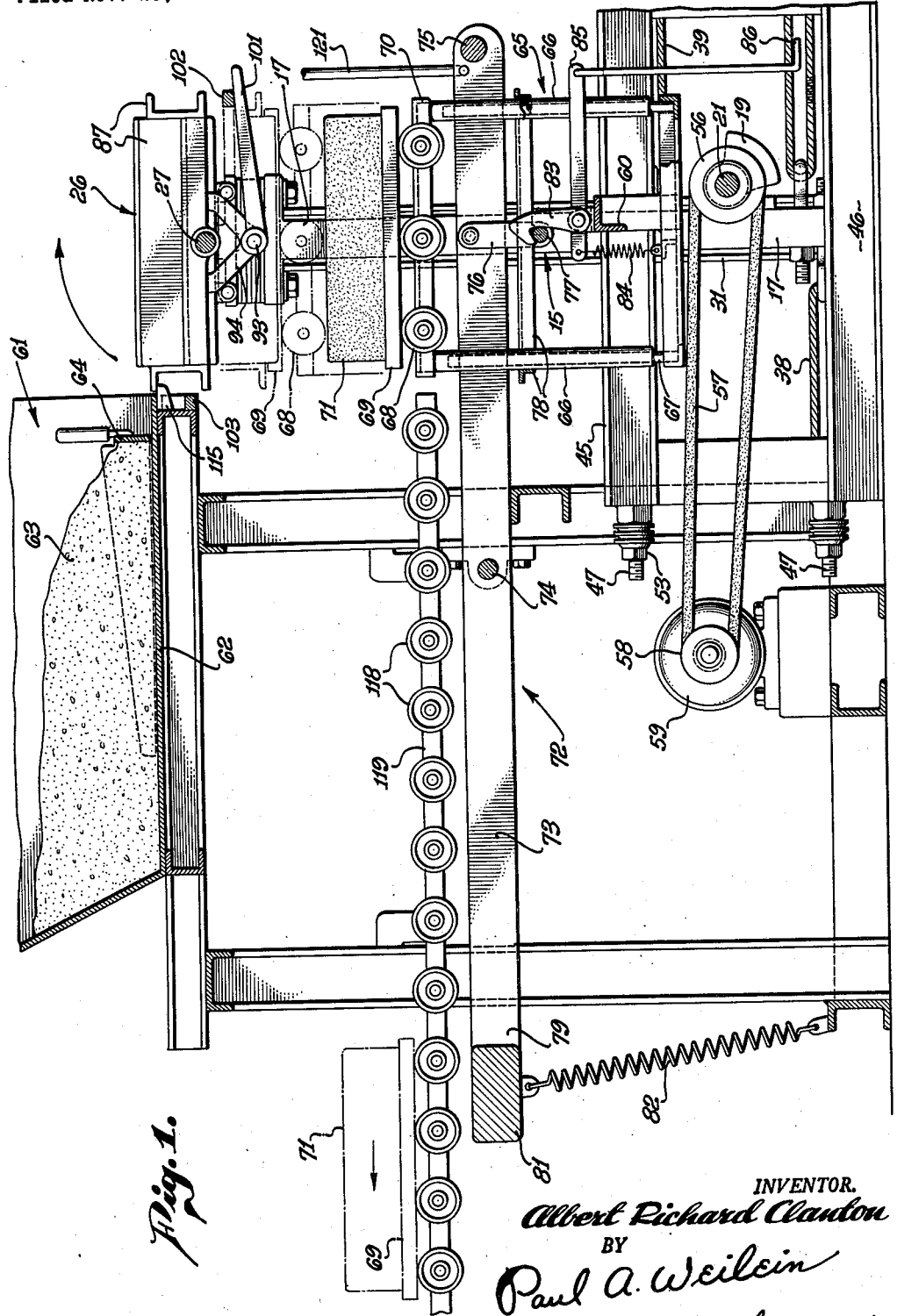
Figure 1 is a side elevation of the machine sectioned to show the internal operating portions thereof. The view of Figure 1 is taken along line 1—1 of Figure 2.

To provide for expeditious filling of the mold 26 when in an upright position, there is provided a hopper 61, the bed 62 of which is co-planar with and adjoins mold 26 (Figure 1). In use, the operator scrapes the desired amount of concrete 63 over the face of the mold, filling it even with the top. The top is then planed off with the scraper 64; and the mold, still in its upright position, is vibrated by vibration of support 15 through motor 59. With the concrete properly packed into the mold through vibration thereof and impact of the shafts 27 and 29 against the surface 33, means are provided for expeditiously removing the molded block from the mold 26. As explained hereinbefore, the stub shafts 27 and 28 of the mold 26 are rotatably mounted in bearings 24 and 25 of uprights 16 and 17, respectively. By rotating mold 26 through 180°, the face of the mold may be directed downwardly, so that the molded article may be dropped therefrom onto a carriage 65, vertically reciprocable immediately below the mold 26.

Carriage 65 is comprised of four vertical tubular members 66, telescoped over vertical rods 67 mounted on the frame of the machine. The upper portion of the carriage includes a horizontal frame 70, in which are rotatably mounted a series of conveyor wheels 68 rotating about a horizontal axis and adapted to receive the pallet 69 carrying the molded article from the mold 26. When the carriage 65 is in its lower position, mold 26 may be rotated to face downwardly, whereupon carriage 65 may be then raised until the wheels 68 contact the pallet 69. Upon vibration of the support 15, molded article 71 drops with its pallet 69 onto wheels 68 of carriage 65, and urges the carriage downward.

Means are provided for controlling the vertical reciprocation of carriage 65, this means taking the form of a double armed boom 72, consisting of arms 73, pivoted about the horizontal shaft 74. Near the forward end of the boom 72, a transverse horizontal shaft 75 is connected between arms 73. Depending rotatably from the arms 73 are a pair of links 76, between the lower ends of which extends another transverse horizontal shaft 77. Shaft 77 extends horizontally between beams 78, which form part of the carriage 65 and are anchored to the vertical tubular members 66.

Thus, by oscillation of boom 72 about shaft 74, the carriage 65 may be raised and lowered, with the links 76 compensating for the slight horizontal shift in position of shaft 75 as the boom oscillates.

The rearward end 79 of the boom 72 is normally biased downward by a weight 81 and a spring 82. This biases upwardly the forward edge of boom 72 and consequently biases upwardly carriage 65.

To restrain carriage 65 at its lower position, a hook latch member 83 is biased by a spring 84 to be hooked over shaft 77, and is released through lever 85 by actuation of a foot pedal 86. Latch automatically slips over shaft 77 as carriage 65 reaches its lower position, and thereby normally restrains it from upward movement.

When the operator desires to raise the carriage 65 to receive a molded block 71 from inverted mold 26, he depresses foot pedal 86, releasing shaft 77 from latch 83; and the carriage 65 is carried upward by the counterclockwise (Figure 1) pivoting of boom 72 about shaft 74, the rotation thereof being transmitted to carriage 65 through links 76 and rod 77.

If desired, only one of the energy storing means, i. e., weight 81 or spring 82, may be employed. The employment of weight 81 produces a steady upward force on carriage 85, while the employment of spring 82 produces a force which is greater at the lower portion of the travel of carriage 65. Spring biased operation may be preferred in certain cases to achieve more rapid acceleration of the carriage; and to effectuate a gentle stop as the carriage reaches the upper limit of its travel, with rollers 68 impinging against pallet 69 bearing molded block 71.

In order to aid in removal of the molded block from the mold 26 after its formation and packing, it is desirable, before attempting downward ejection of the block onto carriage 65, to move at least a portion of the mold walls with respect to the molded block, and thereby break the seal between the block and the mold. For this purpose, the mold 26 is constructed as shown in Figures 7-10, having a frame 87 including the side walls of the mold. It will be noted in Figure 7 that the cavities 88 and 89 of the particular mold illustrated forms simultaneously a pair of identical blocks shaped like an inverted A, as shown in Figure 11. It will be understood that the mold may be given any desired shape.

Movable with respect to the frame and side walls 87 is a pair of bottom walls 91 and 92, one for each of the two identical molds 88 and 89. Bottoms 91 and 92 are connected to frame 87 through an offset shaft 93, the ends of which are journalled in bearings 94 and 95 mounted on frame 87. The central portion of shaft 93 is offset at 96, and upon the offset portion are mounted pairs of brackets 97 and 98, the former supporting bottom 91 and the latter supporting bottom 92. Reference to Figure 9 will show that rotation of shaft 93 in the bearings 94 and 95 causes movement of bottoms 91 and 92 with respect to frame 87 in an arc extending first laterally of frame 87 and then receding therefrom along the arcuate path created by rotation of portion 96 about the axis of portions 93 of the shaft. The net effect of this motion is to cause recession of bottoms 91 and 92 from frame 87 along a line disposed generally obliquely with respect to frame 87.

The construction above described neatly permits breaking away of bottoms 91 and 92 from the molded block by first sliding the bottom with respect to the block, which breaks the seal, and then withdrawing the bottom from the block 71 and the frame 87. While this operation has been described with reference to Figure 9, which would indicate that it takes place with the mold 26 in upright position, the operation is preferably effected after the mold has been inverted to its position shown in Figure 6.

Means are provided for automatically actuating the movable bottoms 91 and 92 in response to rotation of mold 26 about its mounting shaft 27. Such means is shown in Figures 1 and 6 as a lever 101 fixedly attached to one end of shaft 93. Slight angular movement of lever 101 about the axis of shaft 93 produces the necessary arcuate breaking away of bottoms 91—92 from the molded block 71. This angular movement is automatically achieved by the employment of a pair of stop members 102 and 103 mounted on the frame of the machine and disposed approximately diametrically with respect to the rotative axis 27 of mold 26. As mold 26 is rotated into ejecting position, shown in Figure 6, the end of lever 101 strikes stop 103; continued rotation of mold 26 into ejecting position causes rotation of shaft 93 in bearings 94 and 95, and effectuates the above described arcuate recession of bottoms 91 and 92 from the frame and sides 87, thus breaking the molded block 71 free from the bottom walls. The block 71, thus freed from the bottom wall, may be then easily vibrated out of mold 26 onto carriage 85 through operation of motor 59.

During manual return of mold 26 to its upright position for reception of additional concrete 63, lever 101 strikes stop 102 and bottoms 91 and 92 return to the position shown in Figure 1, wherein the bottoms are closely adjacent the frame and walls 87.

In certain types of molds such as shown at 88 and 89, wherein a core member 104 is employed to create in the finished block an opening therethrough, special mounting means are required for the core in order to maintain the core fixed with respect to the outside frame walls 87 and still permit of the sliding arcuate motion of the bottom walls. To this end there is employed, as shown in Figures 8 and 10, core straps 105 which extend across the bottom of frame 87 directly beneath opening 106 in the bottom 92. Through opening 106 extends an anchoring member 107, the upper end of which is attached, as by welding, to core 104 and the lower end of which is attached to the core strap 105. In this manner core 104 is fixed within mold 26 to the frame or side walls 87, while still permitting of relative motion between the bottom 92 and the frame 87. It will be understood that molds 88 and 89 are both of similar construction.

The vibration of mold 26 by support 15, amplified by the shocking of the mold shafts 27 and 28 impacting against surfaces 33, may be very intense, and might in the absence of preventive measures cause inadvertent inversion of the mold 26 by rotation in bearings 24 and 25 before the desired packing has been accomplished, thereby spilling the concrete.

Figure 3:
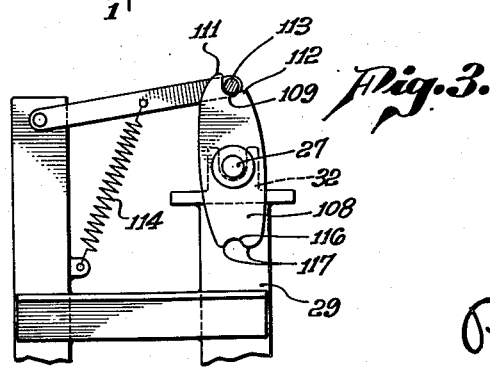
Figure 3 is a fragmentary side elevation showing the latching means for maintaining the mold in upright, or concrete receiving, position during vibration thereof by the machine.

To prevent such occurrence, locking means are provided, as shown in Figures 2 and 3, consisting of an elongate cam member 108 fixed at the end of shaft 27. At one end of cam member 108 is a notch 109 bordered at one side by a high detent 111 and on the other side by a low detent 112. A dog member 113, spring biased toward cam 108 by spring 114 cooperates with notch 109 to form a stop member preventing unwarranted rotation of mold 26. Cam 108 is shown in Figure 3 with the mold in vibrating position, being restrained from rotation in one direction by abutting against a tab 115 adjacent the concrete hopper 61 (Figure 1), and in the other direction by the latching achieved through the cooperation of dog 113 and the high detent 111. Following the vibratory impacting operation, the operator lifts dog 113, permitting clockwise rotation of mold 26 (Figures 1 and 3), allowing high detent 111 to pass under the dog 113.

With the mold in inverted position, the dog 113 resides in recess 116 in the other end of cam 108, being restrained by the low detents 117. Following completion of the ejection operation, the operator manually rotates mold 26 counterclockwise, the detent 113 automatically riding over the low detents 117. As mold 26 approaches upright position, dog 113 automatically is lifted and rides over the cam surface of high detent 111 to seat in notch 109, ready for repetition of the vibratory step.

With carriage 65 in its lower position, the rollers 68 thereof register with the rollers 118 of a stationary conveyor track 119, which extends generally horizontally through the center of machine under hopper 62. Track 119 preferably has a slight downward slant to expedite removal of molded blocks 71 on their pallets 69.

It is desirable, as carriage 65 rises to receive a molded block 71 that support 15 be automatically set into vibration whereby to eject block 71, and that as carriage 65 recedes from mold 26, the vibration should automatically cease. To this end there is provided an actuating rod 121 mounted on the forward end of boom 72, the upper end (not shown) of which operates an electrical switch (not shown) to turn motor 59 off and on. During the other portion of the cycle, i. e., the vibratory impact of concrete 63 into mold 26, the switch for motor 59 is manually operated on and off.

A complete summary of the operation of the machine will now be outlined by illustrating a typical cycle of operation.

At the outset, the mold is upright as shown in Figure 1, and ready to receive concrete 63. The operator standing to the right of the machine (Figure 1) scrapes sufficient concrete 63 into the two molds 88 and 89, and scrapes the top smooth with the scraper 64. He then operates a switch (not shown) to turn on motor 59, which rotates eccentric rotors 18 and 19 through belt 57, pulley 56 and shaft 21. Shaft 21 being mounted on support 15, and support 15 being resiliently held on the elongate elements 36 and 37, the support vibrates up and down at a frequency determined by the rotative velocity of the shaft 21. Inasmuch as the shafts 27 and 28 of mold 26 are mounted on support 15 so as to be normally disposed immediately above the impact surfaces 33 of the U-shaped seats 32 on standards 29 and 31, each downward excursion of mold 26 occasioned by the vibration of support 15 causes shafts 27 and 28 to strike forcibly against the stationary standards 29 and 31. This impact occurs substantially at the point of maximum velocity in the vibration of mold 26. The sudden retardation of mold 26 in its downward excursion is equivalent to a sharp upward impact on the mold, and causes cement 63 therein to be packed well into the mold by vibration and impact utilizing the momentum and weight of the concrete as a driving force. During this operation mold 26 is prevented from rotating in bearings 24 and 25 by the restraining action of dog 113 in notch 109.

The operator then opens the switch, deenergizing motor 59, and stopping vibration of support 15. He then places a pallet 69 over the top of mold 26 and while holding it there with one hand, releases dog 113 with the other hand, and manually pivots mold 26 clockwise about its shaft 27. As mold 26 rotates into its fully inverted position, lever 101 strikes stop 103 (Figure 6), causing rotation of shaft 93, and arcuate recession of bottoms 91 and 92 away from frame 87, thereby breaking loose the bottoms from the molded block 71.

Simultaneously, with manual rotation of mold 26, the operator applies his foot to pedal 86, releasing latch 83 from shaft 77, and allowing carriage 65 to be raised by the urging of weight 81 and spring 92 acting through boom 72, shaft 75, links 76 and shaft 77. As carriage 65 rises to meet the now inverted mold 26 and pallet 69 (Figure 6), the motor 59 is energized through actuation of its switch through rod 121, causing vibration of support 15 and impact of shafts 27 and 28 of mold 26 on the impact surfaces 33. This quickly dislodges the molded block 71 from mold 26 and it slips therefrom onto rollers 68 of carriage 65. The weight of block 71 and pallet 69 on carriage 65 is sufficient to overcome the bias of the weight-spring combination 81, 82; and the carriage 65 is lowered to the position shown in Figure 1, with latch 83 slipping over shaft 77 to hold the carriage in its lowered position. The lowering of carriage 65 pulls down rod 121 to open the switch and deenergize motor 59, whereupon vibration of support 15 ceases.

The operator then gives a slight shove to pallet 69 and block 71; and they move over the rollers 118 toward the outlet end of the roller track 119. The operator then manually returns the mold 26 to its upright position in which it is held by detent 111 and dog 113. As mold 26 is rotated into upright position (Figure 1), lever 101 strikes stop 102 on the machine frame to return bottoms 91 and 92 inwardly to their normal position with respect to frame 87, as shown in Figure 9. The cycle is then ready for repetition.

It will thus be seen that there has been described a machine having particularly advantageous vibrating means, impact means, block removal means, and mounting means, each feature of which, while useful to advantage independently, is particularly advantageous when incorporated in the complete machine described herein.

I claim:

1. Vibratory molding apparatus comprising a mold, a support therefor, rotary vibratory means operatively associated with said support, and mounting means for said support and substantially confining the vibration thereof to a vertical direction, said mounting means comprising laterally spaced anchor members and transverse tension elements connected to said anchor members and to said support in vertically spaced relation.

2. Vibratory molding apparatus comprising a mold, a support therefor, vibratory means associated with said support for inducing vibration thereof, and means mounting said support for vertical vibratory movement comprising anchor members spaced apart laterally on opposite sides of said support and tension elements vertically spaced throughout their length extending transversely between each anchor member and said support.

3. Vibratory molding apparatus comprising a mold, a support therefor, vibratory means associated with said support for inducing vibration thereof, and means mounting said support for vertical vibratory movement comprising anchor members spaced apart laterally on opposite sides of said support, and longitudinally resilient tension elements vertically spaced throughout their length extending transversely between each anchor member and said support.

4. Molding apparatus comprising a mold having a base and side walls, means mounting said mold for oscillation between upright and inverted positions, and means responsive to movement of said mold into inverted position for moving said base relative to said side walls to break the bond between said base and a mold charge.

5. Molding apparatus comprising a mold having a base and side walls, means mounting said base for movement relative to said side walls between charging and charge-releasing positions, means mounting said mold for oscillation between upright and inverted positions, means responsive to movement of said mold into inverted position for moving said base relative to said side walls into charge-releasing position, and means responsive to movement of said mold into upright position for moving said base relative to said side walls into charging position.

6. Molding apparatus comprising a mold having side walls and a base movable relative to said side walls, means mounting said mold for oscillation between upright and inverted positions, shaft means journaled on said side walls and having an eccentric portion connected in supporting relation to said base, and means for rocking said shaft about its axis to cause said eccentric shaft portion to move said base in an arcuate path receding from said side walls.

7. A mold comprising side walls and a base, and means carried by said side walls for supporting said base for movement in an arcuate path receding from said side walls.

8. A mold comprising side walls and a base, means carried by said side walls for supporting said base for movement relative to said side walls between a molding position and a mold charge releasing position, said supporting means being manipulable to move said base between said positions in an arcuate path tangential to said molding position.

9. A mold comprising side walls and a base, and means mounting said base for movement relative to said side walls in a first direction substantially parallel to the plane of said base to break the bond between said base and a mold charge, and then in a second direction receding from said mold charge.

10. A vibratory molding apparatus comprising a mold, vibratory support means for said mold, means for vibrating said support and mold, transfer means beneath said mold and movable vertically between a lower position and an upper position closely subjacent said mold, said transfer means when in said upper position being adapted to receive a molded article released from said mold, and means responsive to movement of said transfer means into said upper position for actuating said vibrating means to release said article from said mold.

11. Molding apparatus comprising a mold, a support therefor, means mounting said mold on said support for movement relative thereto between charging and charge releasing positions, cooperating abutment means on said mold and on said support for stopping said mold at each of said positions, spring-pressed latch means on said support, a latching element movable with said mold, a pair of latch lugs on said element adapted to be selectively engaged by said latch means upon movement of said mold into each of said positions, one of said latch lugs providing an abrupt shoulder engaged by said latch means to securely lock said mold in one position, the other of said latch lugs providing a cam surface adapted to displace said latch means from latching engagement therewith upon application of a predetermined force to said mold.

12. In a molding apparatus: a pair of vertically extending support members; means forming a mold including a pair of oppositely directed aligned pintles engaging said members adjacent their upper ends and supporting said mold thereon for angular movement about a horizontal axis; means adjacent the lower ends of said members mounting said members for vertical vibratory movement; means for vibrating said members; and means respectively adjacent said members providing vertical guide slots for said pintles.

13. In a molding apparatus: a pair of vertically extending support members; means forming a mold including a pair of oppositely directed aligned pintles engaging said members adjacent their upper ends and supporting said mold thereon for angular movement about a horizontal axis; means adjacent the lower ends of said members mounting said members for vertical vibratory movement; means for vibrating said members; and means respectively adjacent said members providing vertical guide slots for said pintles as well as upwardly facing abutment surfaces adapted to be engaged by said pintles on their downward strokes.

ALBERT RICHARD CLANTON.

REFERENCES CITED

The following references are of record in the file of this patent:

UNITED STATES PATENTS

| Number | Name | Date |
|---|---|---|
| 825,919 | Melton | July 17, 1906 |
| 881,815 | Merritt | Mar. 10, 1908 |
| 1,029,559 | Pauly | June 11, 1912 |
| 1,497,134 | Covi | June 10, 1924 |
| 1,587,853 | Ransohoff | June 8, 1926 |
| 1,631,251 | Davis | June 7, 1927 |
| 1,702,253 | Elliot | Feb. 19, 1929 |
| 1,765,064 | Eberling | June 17, 1930 |
| 1,867,144 | Gelbman | July 12, 1932 |
| 1,873,412 | Jackson | Aug. 23, 1932 |
| 2,003,702 | Straub | June 4, 1935 |
| 2,069,880 | Gelbman et al. | Feb. 9, 1937 |
| 2,227,756 | Kirkham | Jan. 7, 1941 |
| 2,298,446 | White | Oct. 13, 1942 |
| 2,311,480 | Shugart et al. | Feb. 16, 1943 |